C. L. BASTIAN.
FLUID PRESSURE REGULATING VALVE.
APPLICATION FILED JUNE 22, 1916.

1,217,901.

Patented Mar. 6, 1917.
2 SHEETS—SHEET 1.

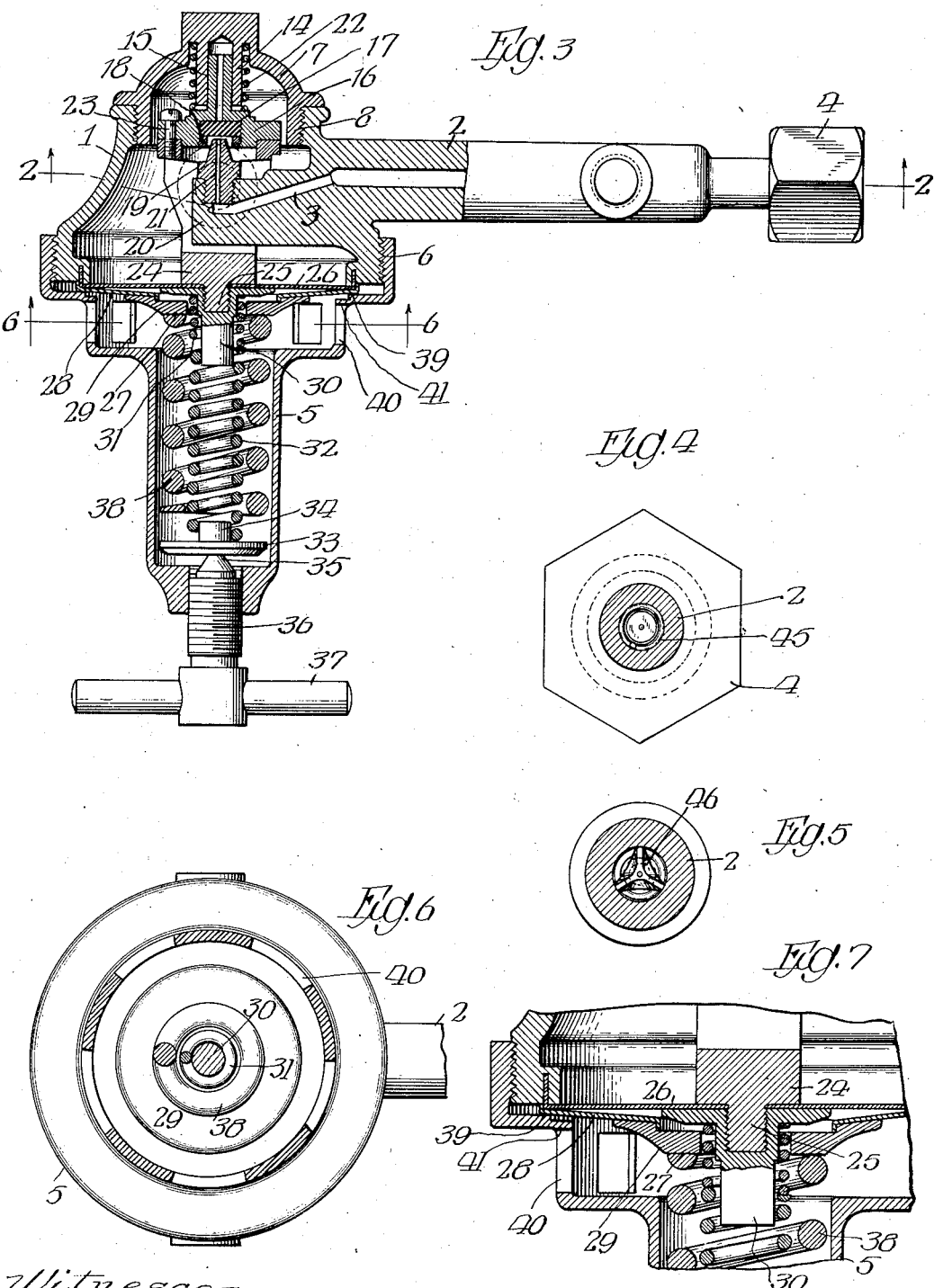

UNITED STATES PATENT OFFICE.

CHARLES L. BASTIAN, OF CHICAGO, ILLINOIS.

FLUID-PRESSURE-REGULATING VALVE.

1,217,901.   Specification of Letters Patent.   Patented Mar. 6, 1917.

Application filed June 22, 1916. Serial No. 105,129.

*To all whom it may concern:*

Be it known that I, CHARLES L. BASTIAN, a citizen of the United States, residing at Chicago, in the county of Cook and State of Illinois, have invented certain new and useful Improvements in Fluid-Pressure-Regulating Valves, as set forth in the following specification.

This invention relates in general to fluid pressure regulating valves and more particularly to a valve for reducing and regulating the pressure of gas while flowing from a source of supply to a point where the gas is utilized.

It is an object of my invention to provide a valve of universal application, equally efficient when employed with high or low initial pressures.

A further object of my invention is the provision of a pressure regulating valve which may be easily regulated to allow the desired reduction of pressure regardless of the initial pressure of the gas and which is operative over a wide range of pressures.

A further object of my invention is the provision in a pressure regulating valve of means to prevent too rapid admission of gas at high pressure to the interior of the casing which might result in scoring the valve seat which coöperates with the inlet, thereby rendering the mechanism ineffective to accomplish the desired result.

A still further object of my invention is the provision in a pressure regulating valve of means insuring the safety of persons in the vicinity thereof by preventing bursting of the bonnet and escape of portions of the diaphragm in the event the diaphragm is ruptured by excessive pressure thereon.

Further objects and advantages of my invention will be apparent as it is better understood by reference to the following specification when read in connection with the accompanying drawing, illustrating the preferred embodiment thereof, in which—

Fig. 3 is a section on the line 3—3 of Fig. 1;

Fig. 4 is an enlarged section on the line 4—4 of Fig. 2;

Fig. 5 is an enlarged section on the line 5—5 of Fig. 2;

Fig. 6 is a section on the line 6—6 of Fig. 3; and

Fig. 7 is an enlarged fragmentary section illustrating a portion of the mechanism shown in Fig. 3.

Figure 1:
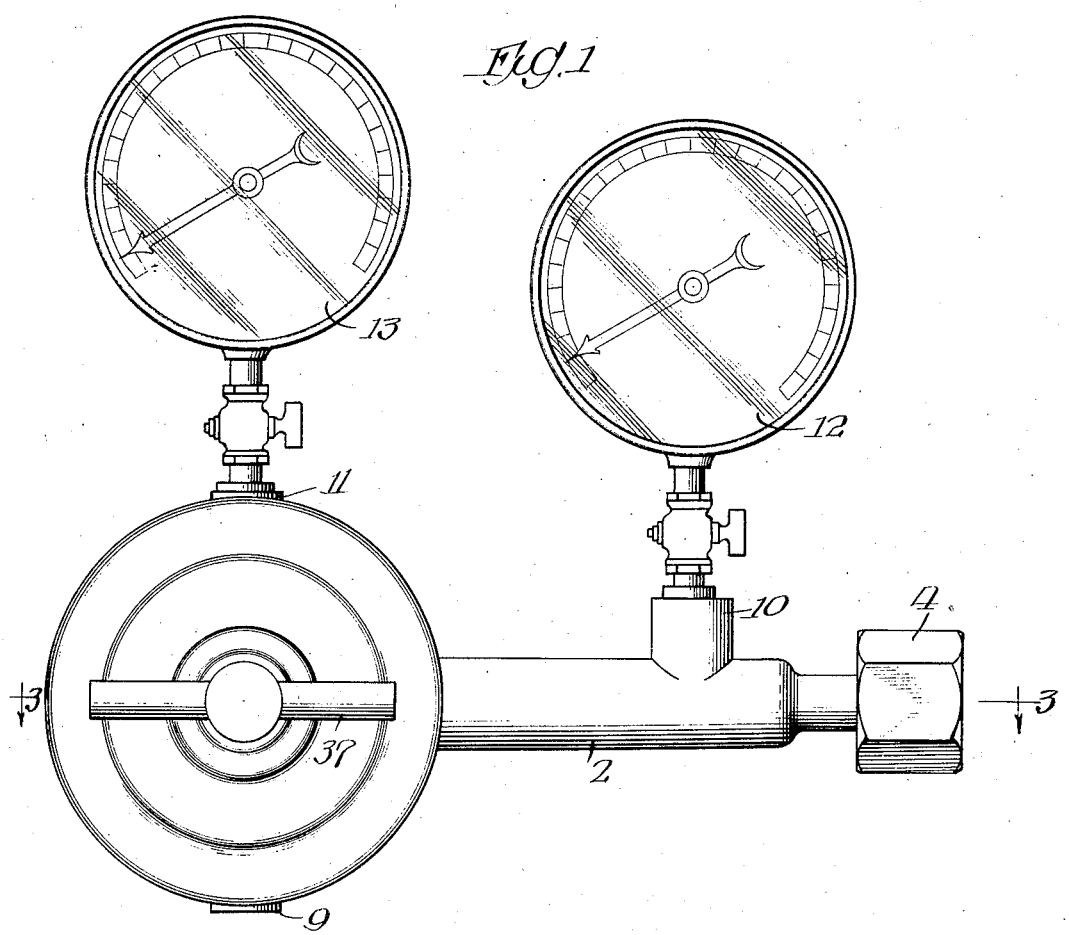
Figure 1 is a side elevation of a pressure regulating valve according to my invention.
Figure 2:
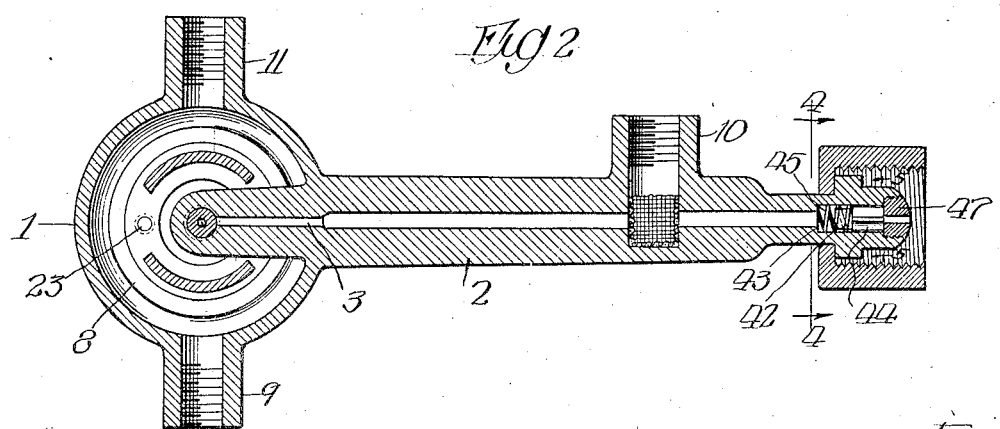
Fig. 2 is a section on the line 2—2 of Fig. 3.

Referring to the drawing, the valve casing comprises a body portion 1 having an inlet pipe 2 integrally formed therewith and provided with an inlet duct 3. The pipe 2 is connected to a source of fluid under pressure by means of a coupling 4. A bonnet 5 is threadedly connected to the body 1 at 6 and a cap 7 is threadedly connected to the opposite end of the body 1 at 8. An outlet 9 is provided through which the fluid is withdrawn from the chamber formed within the casing 1 and outlets 10 and 11 from the pipe 2 and the chamber within the casing 1, respectively, provide means for attaching gages 12 and 13 which indicate, respectively, the pressures of the fluid before and after reduction.

The cap 7 is provided with a centering member 14, preferably formed integrally therewith and adapted to slidably support an extension 15 of a member 16 carrying a valve seat 17 of hard rubber or other suitable material which is retained in position thereon by means of a threaded collar 18. An inlet nozzle 19 is threadedly mounted in a bridge 20 formed within the casing 1 and is provided with a duct 21 connecting with an inlet duct 3. The inlet nozzle 19 is adapted to coöperate with the valve seat under conditions presently to be explained to control the flow of fluid to the chamber within the casing 1. A spring 82 surrounds the centering member 14 and engages the member 16 to normally force the valve seat 17 against the end of the nozzle 19.

The member 16 is secured by means of screws 23 or in any other suitable manner to a yoke 24, an extension 25 of which passes through a relatively thin diaphragm 26, forming one wall of the chamber within the casing 1 and is secured thereto by a flanged collar 27 threadedly mounted on the extension 25. The edges of the diaphragm 26 are secured in any suitable manner to the casing 1. A second and heavier diaphragm 28 is disposed adjacent the diaphragm 26 and spaced therefrom in its central portion, the diaphragm 28 being secured to a collar 29 recessed to receive the flanged collar 27 when the diaphragm 26 is forced outwardly by the pressure of the fluid within the chamber formed by the casing 1.

The flanged collar 27 is provided with a projection 30 and a relatively light spring 31 is disposed about this projection and engages the flange of the collar, the spring passing through a suitable opening in the collar 29 to which the diaphragm 28 is secured. A heavier spring 32 is arranged in tandem with the spring 31 and a cap 33 is provided with a projection 34 which enters the end of the spring 32, the cap 33 being engaged by the end 35 of a screw 36 threadedly mounted in the end of the bonnet 5 and provided with an operating handle 37. A heavy spring 38, which is shorter than the combined length of the springs 31 and 32, surrounds the latter springs and engages the collar 29.

The bonnet 5 is provided with an abutment 39 which engages the outer edge of the diaphragm 28 when the bonnet is in position to clamp the diaphragm securely in position. The bonnet 5 is further provided with a plurality of spaced openings 40 disposed in a wall thereof normal to the plane of the diaphragms 26 and 28 so that the interior of the bonnet is freely open to the atmosphere and the fluid may readily escape therefrom in the event that the diaphragms are ruptured by excessive pressure. Bursting of the bonnet as a result of failure of the diaphragm is thereby prevented. Between the openings 40 the bonnet 5 is provided with a plurality of ledges 41 spaced from the diaphragm 28 and provided with sharp edges so that when the diaphragms are ruptured they will be sheared and caused to bend inwardly, thus preventing any portion thereof from escaping through the openings 40 and the possible injury of persons in the vicinity of the valve.

To prevent injury to the valve seat 17 by too rapid increase of the pressure within the chamber formed by the casing 1 when a source of fluid is first connected thereto I enlarge the duct 3 at 42 to provide a shoulder 43. Within the enlarged portion 42 of the duct 3 I insert a valve 44 and a spring 45 which normally prevents engagement of the valve with the shoulder 43. The valve 44 is provided with a bleeder 46 (Fig. 5) which allows the fluid to pass from the source of supply to the duct 3 when the valve is closed. A plug 47 retains the valve 44 in place. When the fluid is first allowed to flow from its source to the duct 3 the pressure will cause the valve 44 to engage the shoulder 43. The bleeder 46 will allow the passage of fluid to the duct 3 but will limit the movement of the fluid to an extent which prevents too rapid increase of the pressure within the chamber formed by the casing 1. As soon as the pressure is equalized on both sides of the valve 44 it will be opened by the spring 45 and thereafter the flow of fluid will be unobstructed.

The operation of my improved pressure regulating valve will be readily understood from the following brief description thereof. The parts being assembled and the source of fluid connected to the pipe 2, fluid is admitted to the duct 3, the pressure being first regulated by the valve 44. As the pressure rises within the chamber the diaphragm 26 will be forced outwardly, carrying with it the yoke 24 so that the valve seat 17 is moved toward the end of the nozzle 19. The screw 36 is meanwhile adjusted so that the tension on the springs 31 and 32 is sufficient to prevent engagement of the valve seat with the end of the nozzle 19 until the pressure within the chamber is that desired. If the initial pressure of the fluid is low only the spring 31 will operate against the diaphragm 26. If the pressure is higher the spring 31 will be compressed and the spring 32 will operate against the diaphragm 26. If the initial pressure is very high the screw 36 will be operated to force the diaphragm 28, under tension of the spring 38, toward the diaphragm 26, so that the pressure of the gas is opposed by both diaphragms 26 and 28 and by the spring 38 as well as by the springs 31 and 32. The structure and arrangement of the parts is such that the valve is universal in character, being adapted to operate under initial pressures of from one-fourth pound up to and including two-hundred pounds. As soon as the pressure within the chamber 1 is decreased slightly by the escape of some of the fluid through the outlet 9 the springs force the diaphragms inwardly, moving the yoke 24 and consequently carrying the valve seat 17 away from the end of the nozzle 19, thus allowing more fluid to flow to the chamber until the pressure has again sufficiently risen to force the diaphragms outwardly and close the inlet.

Should the pressure within the chamber, through a failure of any of the parts, rise to a point which is greater than the diaphragms are capable of withstanding the diaphragms will be ruptured but owing to the provision of the openings 40 the fluid readily escapes and the bonnet 5 will not be injured. Furthermore the provision of the ledges 41 insures the shearing of the diaphragms and the bending thereof inwardly away from the openings 41 so that the openings can not be covered and no portion of the diaphragms can escape to injure persons in the vicinity of the valve. It will be understood, therefore, that I have succeeded in devising an absolutely safe pressure regulating valve and that in addition my improved valve may be employed with a wide range of pressures, thus obviating the necessity of providing different valves for the different pressures encountered in the practical use of devices of this character.

It will be apparent that various changes may be made in the form, construction and arrangement of the parts without departing from the spirit and scope of the invention or sacrificing any of its material advantages, the form hereinbefore described being merely a preferred embodiment thereof.

I claim:

1. In a pressure regulating valve, the combination of a casing providing a chamber, pressure sensitive means forming a wall of said chamber, an inlet to and an outlet from said chamber, means connected to said pressure sensitive means for controlling said inlet, a bonnet connected to said casing, resilient means of different strengths arranged one within the other within said bonnet and adapted to apply pressure to said pressure sensitive means, the outer and stronger resilient means being of greater cross-sectional area and shorter than the inner and weaker resilient means, and means for simultaneously tensioning said inner resilient means and causing said outer resilient means to become effective.

2. In a pressure regulating valve, the combination of a casing providing a chamber, pressure sensitive means forming a wall of said chamber, an inlet to and an outlet from said chamber, means connected to said pressure sensitive means for controlling said inlet, a bonnet connected to said casing, and resilient means of different strengths arranged one within the other within said bonnet and adapted to apply pressure to said pressure sensitive means, the inner and weaker resilient means comprising two springs of different strengths arranged in tandem and the outer and stronger resilient means being shorter than the combined length of said springs, whereby said pressure sensitive means is first subjected to the pressure of the latter.

3. In a pressure regulating valve, the combination of a casing providing a chamber, an inlet to and an outlet from said chamber, pressure sensitive means comprising a pair of superposed diaphragms forming a wall of said chamber, means connected to one of said diaphragms for controlling said inlet, and resilient means adapted to apply pressure separately to said diaphragms.

4. In a pressure regulating valve, the combination of a casing providing a chamber, an inlet to and an outlet from said chamber, pressure sensitive means comprising a pair of superposed diaphragms forming a wall of said chamber, means connected to one of said diaphragms for controlling said inlet, springs adapted to apply pressure separately to said diaphragms, and means for regulating the tension of said springs.

5. In a pressure regulating valve, the combination of a casing providing a chamber, an inlet to and an outlet from said chamber, pressure sensitive means comprising a pair of superposed diaphragms forming a wall of said chamber, means connected to one of said diaphragms for controlling said inlet, means adapted to apply pressure separately to said diaphragms comprising an outer heavy spring and an inner lighter spring, and means for regulating the tension of said springs.

6. In a pressure regulating valve, the combination of a casing providing a chamber, an inlet to and an outlet from said chamber, pressure sensitive means comprising a pair of superposed diaphragms forming a wall of said chamber, means connected to one of said diaphragms for controlling said inlet, and resilient means adapted to apply pressure separately to said diaphragms comprising an outer heavy spring and a pair of light springs arranged in tandem within said outer spring.

7. In a pressure regulating valve, the combination of a casing providing a chamber, an inlet to and an outlet from said chamber, pressure sensitive means comprising a pair of superposed diaphragms forming a wall of said chamber, means connected to one of said diaphragms for controlling said inlet, resilient means adapted to apply pressure separately to said diaphragms comprising an outer heavy spring and a pair of light springs arranged in tandem within said outer spring, said heavy spring being shorter than the combined length of said light springs, whereby said pressure sensitive means is first subjected to the pressure of the latter, and means for regulating the tension of said springs.

8. In a pressure regulating valve, the combination of a casing providing a chamber, an inlet to and an outlet from said chamber, pressure sensitive means forming a wall of said chamber comprising a relatively thin diaphragm and a superposed and heavier diaphragm, means connected to said thin diaphragm for controlling said inlet, resilient means comprising a pair of springs of different strengths adapted to apply pressure to said light diaphragm, a heavy spring inclosing said pair of springs and adapted to apply pressure to said heavier diaphragm, and means for regulating the tension of said springs.

9. In a pressure regulating valve, the combination of a casing providing a chamber, pressure sensitive means forming a wall of said chamber, an inlet to and an outlet from said chamber, means connected to said pressure sensitive means for controlling said inlet, a bonnet connected to said casing, resilient means of different strengths arranged one within the other within said bonnet and adapted to apply pressure to said pressure sensitive means, the outer and stronger resilient means being of greater cross-sectional area and shorter than the inner and weaker resilient means, whereby said pressure sensitive means is first subjected to the pressure of the latter, and means adjacent said inlet to prevent a rapid increase of pressure in said chamber when fluid is first admitted thereto, whereby injury to the mechanism is prevented.

10. In a pressure regulating valve, the combination of a casing providing a chamber, an inlet to and an outlet from said chamber, pressure sensitive means forming a wall of said chamber comprising a relatively thin diaphragm and a superposed and heavier diaphragm, means connected to said thin diaphragm for controlling said inlet, resilient means comprising a pair of springs of different strengths adapted to apply pressure to said light diaphragm, a heavy spring inclosing said pair of springs and adapted to apply pressure to said heavier diaphragm, means for regulating the tension of said springs, a fluid conductor leading to said inlet, and a check valve provided with a bleeder in said fluid conductor to prevent a rapid increase in pressure in said chamber when fluid is first admitted thereto, whereby injury to the mechanism is prevented.

11. In a pressure regulating valve, the combination of a casing providing a chamber, pressure sensitive means forming a wall of said chamber, an inlet to and an outlet from said chamber, means connected to said pressure sensitive means for controlling said inlet, a bonnet connected to said casing, said bonnet being freely open to the atmosphere to allow the escape of fluid upon rupture of said pressure sensitive means, resilient means of different strengths arranged one within the other within said bonnet and adapted to apply pressure to said pressure sensitive means, the outer and stronger resilient means being of greater cross-sectional area and shorter than the inner and weaker resilient means, and means for simultaneously tensioning said inner resilient means and causing said outer resilient means to become effective.

12. In a pressure regulating valve, the combination of a casing providing a chamber, an inlet to and an outlet from said chamber, pressure sensitive means forming a wall of said chamber, means connected to said pressure sensitive means for controlling said inlet, a spring adapted to apply pressure to said pressure sensitive means, a bonnet connected to said casing, surrounding said spring and having a plurality of spaced openings to allow the escape of fluid upon rupture of said pressure sensitive means, and ledges between said openings spaced from said pressure sensitive means to shear the latter means and cause it to bend inwardly, thereby preventing portions thereof from escaping through said openings.

13. In a pressure regulating valve, the combination of a casing providing a chamber, an inlet to and an outlet from said chamber, pressure sensitive means forming a wall of said chamber, comprising a relatively thin diaphragm and a superposed and heavier diaphragm, means connected to said thin diaphragm for controlling said inlet, resilient means comprising a pair of springs of different strengths adapted to apply pressure to said light diaphragm, a heavy spring inclosing said pair of springs and adapted to apply pressure to said heavier diaphragm, means for regulating the tension of said springs, and a bonnet connected to said casing surrounding said springs and having a plurality of spaced openings to allow the escape of fluid upon rupture of said pressure sensitive means.

14. In a pressure regulating valve, the combination of a casing providing a chamber, an inlet to and an outlet from said chamber, pressure sensitive means forming a wall of said chamber, comprising a relatively thin diaphragm and a superposed and heavier diaphragm, means connected to said thin diaphragm for controlling said inlet, resilient means comprising a pair of springs of different strengths adapted to apply pressure to said light diaphragm, a heavy spring inclosing said pair of springs and adapted to apply pressure to said heavier diaphragm, means for regulating the tension of said springs, a bonnet connected to said casing surrounding said springs and having a plurality of spaced openings to allow the escape of fluid upon rupture of said pressure sensitive means, and ledges between said openings spaced from said pressure sensitive means to shear the latter means and cause it to bend inwardly, thereby preventing portions thereof from escaping through said openings.

CHARLES L. BASTIAN.

Witnesses:
M. A. KIDDIE,
WM. O. BELT.